(12) United States Patent
Kim et al.

(10) Patent No.: US 11,345,263 B2
(45) Date of Patent: May 31, 2022

(54) APPARATUS FOR TILTING SEAT CUSHION OF VEHICLE REAR SEAT

(71) Applicants: Hyundai Motor Company, Seoul (KR); Kia Motors Corporation, Seoul (KR); Daewon Precision Industrial Co., Ltd, Ansan-si (KR)

(72) Inventors: Ji Hwan Kim, Seoul (KR); Tae Hoon Lee, Suwon-si (KR); Byeong Seon Son, Seoul (KR); Sang Hoon Park, Incheon (KR); Seon Chae Na, Yongin-si (KR); Sang Ho Kim, Incheon (KR); Byoung Tae Seo, Cheonan-si (KR)

(73) Assignees: Hyundai Motor Company, Seoul (KR); Kia Motors Corporation, Seoul (KR); Daewon Precision Industrial Co., Ltd, Ansan-si (KR)

( * ) Notice: Subject to any disclaimer, the term of this patent is extended or adjusted under 35 U.S.C. 154(b) by 0 days.

(21) Appl. No.: 17/182,503

(22) Filed: Feb. 23, 2021

(65) Prior Publication Data
US 2022/0118891 A1    Apr. 21, 2022

(30) Foreign Application Priority Data
Oct. 16, 2020   (KR) .................. 10-2020-0134118

(51) Int. Cl.
*B60N 2/30*    (2006.01)
*B60N 2/02*    (2006.01)

(52) U.S. Cl.
CPC ......... *B60N 2/3061* (2013.01); *B60N 2/0232* (2013.01); *B60N 2002/024* (2013.01); *B60N 2002/0236* (2013.01)

(58) Field of Classification Search
CPC .. B60N 2/3061; B60N 2/3054; B60N 2/3038; B60N 2/0232; B60N 2/0224; B60N 2002/0236; B60N 2002/024
USPC ....................................... 297/330
See application file for complete search history.

(56) References Cited

U.S. PATENT DOCUMENTS

| 3,712,573 A | * | 1/1973 | Pickles | B60N 2/0224 248/394 |
| 2020/0062148 A1 | * | 2/2020 | Yun | B60N 2/1695 |
| 2020/0101868 A1 | * | 4/2020 | Kim | B60N 2/14 |
| 2020/0101869 A1 | * | 4/2020 | Bouzid | B60N 2/0232 |
| 2020/0307420 A1 | * | 10/2020 | Moon | B60N 2/36 |

(Continued)

FOREIGN PATENT DOCUMENTS

| DE | 102008051596 | * 10/2008 |
| JP | 2005-306253 A | 11/2005 |

(Continued)

OTHER PUBLICATIONS

Machine translation from Espacenet of DE102008051596 (Year: 2021).*

*Primary Examiner* — Mark R Wendell
(74) *Attorney, Agent, or Firm* — Morgan, Lewis & Bockius LLP

(57) ABSTRACT

An apparatus of tilting a seat cushion of a rear seat may include a tilting function additionally provided to a seat cushion of a rear seat, so when a seatback reclines, it is possible to tilt up the front end portion of the seat cushion and sufficiently support the thighs of a passenger sitting in the rear seat using the front end portion of the seat cushion tilted upwards.

11 Claims, 5 Drawing Sheets

(56) References Cited

U.S. PATENT DOCUMENTS

2021/0070200 A1\* 3/2021 Jung .................. B60N 2/22
2021/0170918 A1\* 6/2021 Kim .................. B60N 2/3045

FOREIGN PATENT DOCUMENTS

KR  10-2015-0045021 A  4/2015
KR  10-2018-0002299 A  1/2018

\* cited by examiner

APPARATUS FOR TILTING SEAT CUSHION OF VEHICLE REAR SEAT

CROSS REFERENCE TO RELATED APPLICATION

The present application claims priority to Korean Patent Application No. 10-2020-0134118, filed on Oct. 16, 2020, the entire contents of which is incorporated herein for all purposes by this reference.

BACKGROUND OF THE INVENTION

Field of the Invention

The present invention relates to an apparatus of tilting a seat cushion of a vehicle rear seat, and more specifically, to an apparatus of tilting a seat cushion of a vehicle rear seat, which is configured for adjusting the upward/downward height of the front portion of seat cushion, improving the ride quality of the rear seat occupant.

Description of Related Art

In general, a vehicle seat includes a seat back for supporting the upper body of the occupant, a seat cushion for supporting the lower body of the occupant, and a headrest for supporting his or her head. In addition, a seat back frame and a seat cushion frame define the skeletons of the seat back and the seat cushion, respectively.

Rear seats of some high-end cars are provided with a seat cushion sliding function for adjusting the seat position in a response to a forward sliding movement of the seat cushion, a seat back reclining function for reclining the seat back in a response to a forward sliding movement of the seat cushion, and accordingly adjusting the seat back angle, and a function for adjusting the angle of the headrest in the forward/backward direction thereof, contributing to improvement of the occupant's comfort.

However, conventional rear seats have a drawback in that the same only have a function for sliding the seat cushion in the forward/backward direction thereof, and has no function for adjusting the upward/downward height of the seat cushion. As a result, the conventional rear seats cannot sufficiently support the occupant's thighs and thus fail to improve the ride quality.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus of supporting a seat cushion of a vehicle rear seat, wherein the seat cushion that forms the rear seat is additionally endowed with a tilting function such that the occupant's thighs may be supported sufficiently, further improving the convenience and ride quality of the rear seat occupant.

An apparatus of tilting a seat cushion of a vehicle rear seat according to various exemplary embodiments of the present invention may include: a cushion tilting frame coupled to a cushion base frame to be configured to tilt by moving upwards and downwards with respect to the cushion base frame coupled to seat rails; a tilting motor mounted to the cushion tilting frame; and a power transmission mechanism connecting the tilting motor, the cushion base frame, and the cushion tilting frame to tilt the cushion tilting frame when the tilting motor is operated.

The apparatus may include a rear cross pipe disposed in a predetermined direction through a rear end portion of the cushion base frame and coupled to a rear end portion of the cushion tilting frame. When power from the tilting motor is transmitted to the cushion tilting frame through the power transmission mechanism, the entire cushion tilting frame may tilt by rotating up and down around the rear cross pipe, which is configured as a hinge point, with respect to the cushion base frame.

The tilting motor may be coupled to be positioned outside a side of the cushion tilting frame.

The power transmission mechanism may include: a pinion gear connected to the tilting motor and rotatably coupled to the cushion tilting frame, wherein the pinion gear is configured to rotate with respect to the cushion tilting frame when the tilting motor is operated; a rack gear engaged with the pinion gear and configured to move straight when the pinion gear is rotated; a connection shaft coupled to an end of the rack gear, disposed through a guide slot formed at the cushion tilting frame, and movable along the guide slot when the rack gear is moved; a front cross pipe disposed in the left and right direction through a front end portion of the cushion tilting frame to be rotatable with respect to the cushion tilting frame; and a link assembly coupled to connect the connection shaft, the front cross pipe, and the cushion base frame.

The guide slot may be elongated in the cushion tilting frame in a front and rear direction ahead of the pinion gear so that the connection shaft moves in the longitudinal direction along the guide slot.

The link assembly may include: a fixed bracket integrally fixed to the front cross pipe; a first link pivotally coupled to the connection shaft and the fixed bracket such that both end portions thereof can rotate; and a second link coupled to the fixed bracket and the cushion base frame such that both end portions thereof can rotate.

The tilting motor, the pinion gear, the rack gear, the connection shaft, and the first link may be each one piece and positioned on only one side of the seat cushion frame. The fixed bracket and the second link may be each two pieces and positioned on left and right sides of the seat cushion frame.

The tilting motor and the power transmission mechanism may be disposed in parallel with each other along a front and rear straight line to reduce a package of a driving mechanism.

The pinion gear may be positioned inside a side of the cushion tilting frame to be rotatable with respect to the cushion tilting frame by power received from the tilting motor.

The rack gear may be disposed in a front and rear direction with a rear thereof engaged with the pinion gear.

The connection shaft may be disposed in the left and right direction through a front end portion of the rack gear, an external portion of the connection shaft may pass through the guide slot, and an internal portion thereof may be coupled to the link assembly.

The rotational motion of the tilting motor may change into straight motion through the pinion gear, the rack gear, and the connection shaft, the straight motion may change back into rotational motion through the link assembly and may be then transmitted to the cushion tilting frame, and a sitting surface of the cushion tilting frame may be tilted up and down by the transmitted rotational motion.

A seat cushion tilting apparatus according to various exemplary embodiments of the present invention is advantageous in that the seat cushion that forms the rear seat is additionally endowed with a tilting function such that, during a seat back reclining operation, the front end portion of the seat cushion is tilted upwards, and the occupant's thighs may be sufficiently supported by use of the upward-tilted upper end portion of the seat cushion, further improving the convenience and ride quality of the rear seat occupant.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
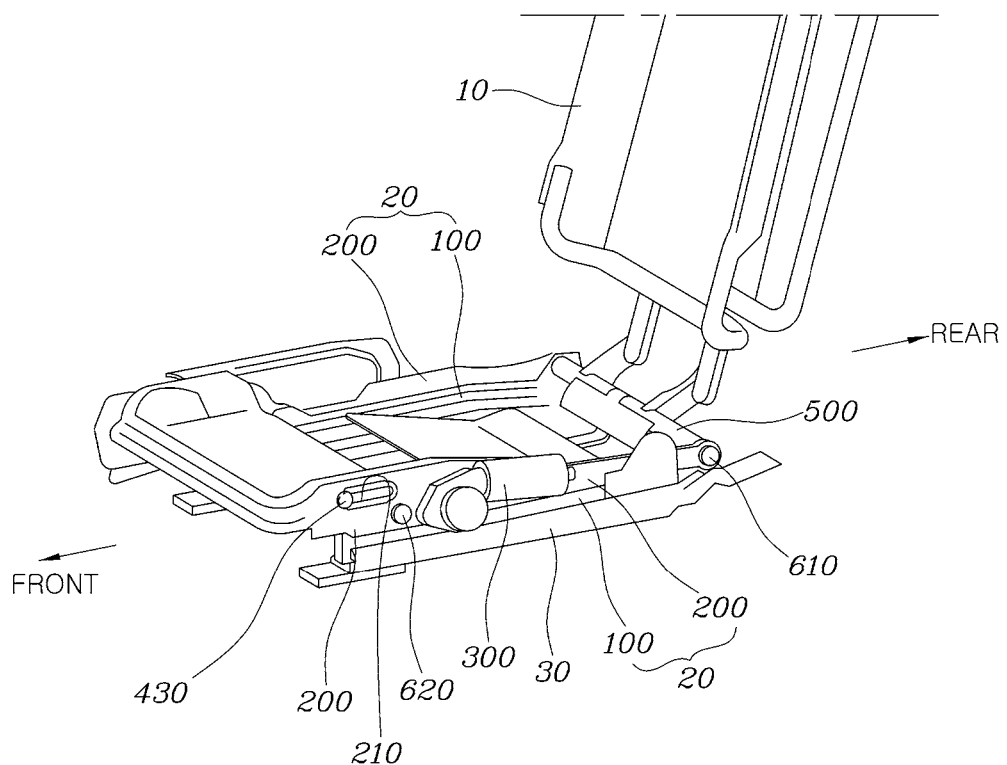
FIG. 1 and FIG. 2 are perspective views showing the state before tilting of a rear seat provided with an apparatus of tilting a seat cushion according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

A specific structural or functional description of embodiments of the present invention included in the specification or application is provided merely for describing the exemplary embodiment according to various exemplary embodiments of the present invention. Therefore, the exemplary embodiments according to various exemplary embodiments of the present invention may be implemented in various forms, and the present invention may not be construed as being limited to the exemplary embodiments described in the specification or application.

Various changes and modifications may be made to the exemplary embodiments according to various exemplary embodiments of the present invention, and therefore various exemplary embodiments will be illustrated in the drawings and described in the specification or application. However, it may be understood that embodiments according to the concept of the present invention are not limited to the particular disclosed exemplary embodiments of the present invention, but the present invention includes all modifications, equivalents, and alternatives falling within the spirit and scope of the present invention.

Such terms as "a first" and/or "a second" may be used to described various elements, but the elements may not be limited by these terms. These terms are intended merely to distinguish one element from other elements. For example, a first element may be named a second element and similarly a second element may be named a second element without departing from the scope of protection of the present invention.

In the case where an element is referred to as being "connected" or "accessed" to other elements, it may be understood that not only the element is directly connected or accessed to the other elements, but also another element may exist between them. Contrarily, in the case where a component is referred to as being "directly connected" or "directly accessed" to any other component, it may be understood that there is no component therebetween. The other expressions of describing a relation between structural elements, i.e., "between" and "merely between" or "neighboring" and "directly neighboring", may be interpreted similarly to the above description.

The terms used in various exemplary embodiments of the present invention are merely used to describe specific embodiments, and are not intended to limit the present invention. A singular expression may include a plural expression unless they are definitely different in a context. As used herein, the expression "include" or "have" are intended to specify the existence of mentioned features, numbers, steps, operations, elements, components, or combinations thereof, and may be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which various exemplary embodiments of the present invention pertains. Such terms as those defined in a used dictionary may be interpreted to have the meanings equal to the contextual meanings in the relevant field of art, and are not to be interpreted to have ideal or excessively formal meanings unless clearly defined in various exemplary embodiments of the present invention.

A control unit (controller) according to exemplary embodiments of the present invention may be implemented by a non-volatile memory which is configured to store data pertaining to an algorithm configured to control operations of various vehicle components or software instructions for reproducing the algorithm, and a processor which is configured to perform the operations as described below by use of the data stored in the corresponding memory. Here, the memory and the processor may be implemented as individual chips. Alternatively, the memory and the processor may be implemented as an integrated single chip. The processor may be in a form of one or more processors.

An apparatus of tilting a seat cushion of a rear seat according to exemplary embodiments of the present invention is described hereafter in detail with reference to the accompanying drawings.

As shown in FIG. 1, FIG. 2, FIG. 3, FIG. 4, FIG. 5, FIG. 6, FIG. 7, and FIG. 8, an automotive seat includes a seatback 1 that supports the upper body of a passenger, a seat cushion 2 that supports the lower body of a passenger, and a headrest 3 that supports the head of a passenger. The frames of the seatback 1 and the seat cushion 2 are respectively formed by a seatback frame 10 and a seat cushion frame 20.

The rear seats of some high-end cars have a seat cushion-sliding function that adjusts the position of the seat in a response to forward sliding of the seat cushion 2 and a seatback-reclining function that reclines rearward the seatback 1 in a response to forward sliding of the seat cushion 2, adjusting the angle of the seatback 1, which contributes to improving convenience for passengers.

Figure 8:
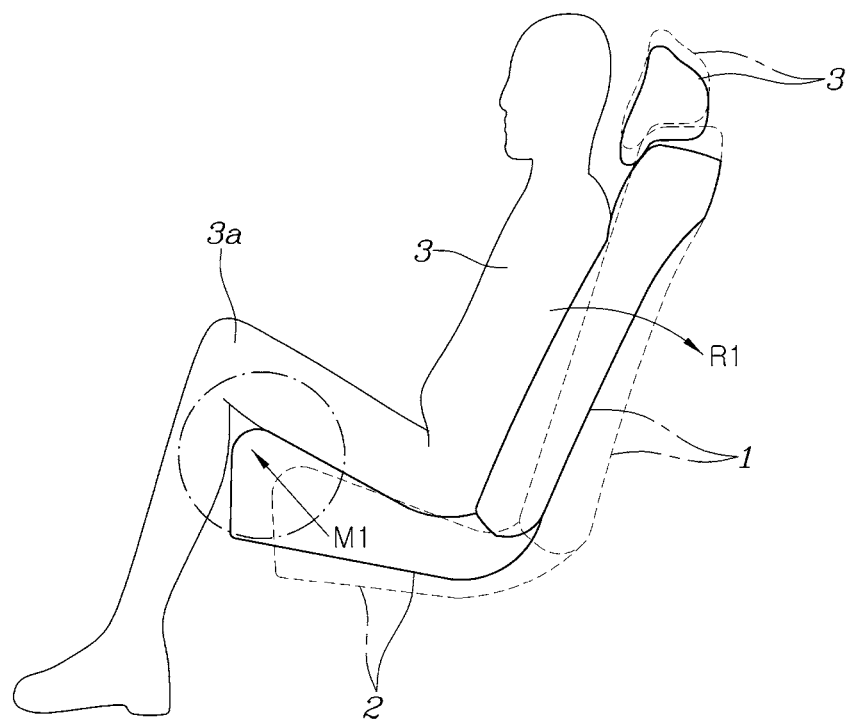
FIG. 8 is a view showing the states before and after tilting of a seat cushion.

According to various exemplary embodiments of the present invention, when the seat cushion 2 slides forward and the seatback 1 reclines rearward (see the arrow R1 in FIG. 8), the front end portion of the seat cushion 2 tilts up (see the arrow M1 in FIG. 8). Accordingly, it is possible to sufficiently support the thighs 3a of a passenger 3 with the lifted seat cushion 2, whereby it is possible to further improve convenience and riding comfort for the passenger in the rear seat.

To the present end, an apparatus of tilting a seat cushion of a rear seat according to various exemplary embodiments of the present invention includes: a cushion tilting frame 200 coupled to a cushion base frame 100 to be configured to tilt by moving upwards and downwards with respect to the cushion base frame 100 coupled to seat rails 30; a tilting motor 300 fixed to the cushion tilting frame 200; and a power transmission mechanism 400 connecting the tilting motor, the cushion base frame, and the cushion tilting frame to tilt the cushion tilting frame when the tilting motor is operated.

The seat cushion frame 20 according to various exemplary embodiments of the present invention includes the cushion base frame 100 and the cushion tilting frame 200.

The cushion base frame 100 is combined with the seat rails 30. The seat rail 30 includes fixed rails extending forward and rearward and fixed to a floor panel and moving rails coupled to the fixed rails and moving forward and rearward on the fixed rails. The moving rails and the cushion frame 100 are integrally combined.

The present invention further includes a rear cross pipe 500 disposed in the left and right direction through the rear end portion of the cushion base frame 100.

Both end portions of the rear cross pipe 500 are coupled to the cushion base frame 100 by first hinges 610.

The rear end portion of the cushion tilting frame 200 is coupled to the rear cross pipe 500.

Accordingly, when the power from the tilting motor 300 is transmitted to the cushion tilting frame 200, the entire cushion tilting frame 200 tilts by rotating up and down around the rear cross pipe 500, which is configured as a hinge point, with respect to the cushion base frame 100.

That is, when the cushion tilting frame 200 tilts by moving upwards and downwards, the hinge point of the cushion tilting frame 200 is the rear cross pipe 500.

The lower end portion of the seatback frame 10 is integrally fixed to the rear cross pipe 500 by welding.

The tilting motor 300 according to various exemplary embodiments of the present invention is coupled to be positioned outside a side of the cushion tilting frame 200.

That is, according to the common structure of the related art, a tilting motor is positioned inside a seat cushion frame, so when a passenger sits, the motor comes in contact with the passenger, so there is a defect that riding comfort deteriorates. Furthermore, when a tilting motor is positioned inside a seat cushion frame, there is a defect that it is required to solve the problem of interference with a duct or other additional portions that need to be provided for ventilation of the seat.

However, when the tilting motor 300 is positioned outside a side of the cushion tilting frame 200, as in various exemplary embodiments of the present invention, the problem of contact with a passenger may be solve, which contributes to improving riding comfort. Furthermore, it is possible to additionally install other portions inside the cushion tilting frame 200, which may be a large help in terms of use of a space.

The power transmission mechanism 400 according to various exemplary embodiments of the present invention includes: a pinion gear 410 connected to the tilting motor 300 and rotating with respect to the cushion tilting frame 200 when the tilting motor 300 is operated; a rack gear 420 engaged with the pinion gear 410 and moving straight when the pinion gear 410 is rotated; a connection shaft 430 coupled to the rack gear 420, disposed through a guide slot 210 formed at the cushion tilting frame 200, and moving along the guide slot 210 when the rack gear 420 is moved; a front cross pipe 440 disposed in the left and right direction through the front end portion of the cushion tilting frame 200 to be rotatable with respect to the cushion tilting frame 200; and a link assembly 450 coupled to connect the connection shaft 430, the front cross pipe 440, and the cushion base frame 100.

The pinion gear 410 is disposed to be rotatably with respect to the cushion tilting frame 200 and is coupled to a motor shaft 310 of the tilting motor 300. Accordingly, the pinion gear 410 rotates when the tilting motor 300 is operated, and may be a worm gear, if necessary.

The rack gear 420 is disposed forward and rearward in the longitudinal direction of the cushion tilting frame 200 with the rear end portion having gear teeth engaged with the pinion gear 410 and the opposite front end portion thereof is integrally coupled to the connection shaft 430 passing through the front end portion by welding. Accordingly, when the rack gear 420 moves forward and rearward, the connection shaft 430 moves forwards and rearwards thereof along the guide slot 210 formed at the cushion tilting frame 200.

The front cross pipe 440 is disposed in parallel with the rear cross pipe 500 with both end portions coupled to be rotatable with respect to the cushion tilting frame 200 by a second hinge 620.

When the tilting motor 300 is operated and the pinion gear 410 is rotated, the rack gear 420 moves straight. As the rack gear 420 moves, the connection shaft 430 moves straight along the guide slot 210 formed at the cushion tilting frame 200. As the connection shaft 430 moves, the front end portion of the cushion tilting frame 200 tilts by moving upwards and downwards. To the present end, the guide slot 210 may be positioned ahead of the pinion gear 410, and the guide slot 210 may be elongated forward and rearward to increase the tilting angle such that the connection shaft 430 moves forwards and rearwards thereof along the guide slot 210.

The link assembly 450 according to various exemplary embodiments of the present invention includes: a fixed bracket 451 integrally fixed to the front cross pipe 440 by welding; a first link 452 coupled to the connection shaft 430 and the fixed bracket 451 such that both end portions thereof can rotate; and a second link 453 coupled to the fixed bracket 451 and the cushion base frame 100 such that both end portions thereof can rotate.

An end portion of the first link 452 is rotatably coupled to the connection shaft 430 by a third hinge 630 and the other end portion of the first link 452 is rotatably coupled to the fixed bracket 451 by a fourth hinge 640.

An end portion of the second link 453 is rotatably coupled to the fixed bracket 451 by a fifth hinge 650 and the other end portion of the second link 453 is rotatably coupled to the cushion base frame 100 by a sixth hinge 660.

In the apparatus according to various exemplary embodiments of the present invention, to reduce the weight and the manufacturing cost, the tilting motor 300, the pinion gear 410, the rack gear 420, the connection shaft 430, and the first link 452 each may be one piece and may be positioned on only one side of the seat cushion frame 20. Furthermore, for smooth tilting of the cushion tilting frame 200, the fixed bracket 451 and the second link 453 each may be two pieces and may be positioned on left and right sides of the seat cushion frame 20.

According to various exemplary embodiments of the present invention, the tilting motor 300 and the power transmission mechanism 400 are disposed in parallel with each other along a front and rear straight line to reduce the package of a driving mechanism.

The pinion gear 410 is positioned inside a side of the cushion tilting frame 200 to be rotatable with respect to the cushion tilting frame 200 by the power from the tilting motor 300. The rack gear 420 is disposed in the front and rear direction with the rear engaged with the pinion gear 410. The connection shaft 430 is disposed in the left and right direction through the front end portion of the rack gear 420.

The external portion of the connection shaft 430 disposed in the left and right direction through the front end portion of the rack gear 420 passes through the guide slot 210 formed at the cushion tilting frame 200 and the internal end portion thereof is coupled to the first link 452 of the link assembly 450.

According to various exemplary embodiments of the present invention, rotational motion of the tilting motor 300 changes into straight motion through the pinion gear 410, the rack gear 420, and the connection shaft 430, the straight motion changes back into rotational motion through the link assembly 450 and is then transmitted to the cushion tilting frame 200. The sitting surface of the cushion tilting frame 200 is tilted up and down by the transmitted rotational motion.

Figure 2:
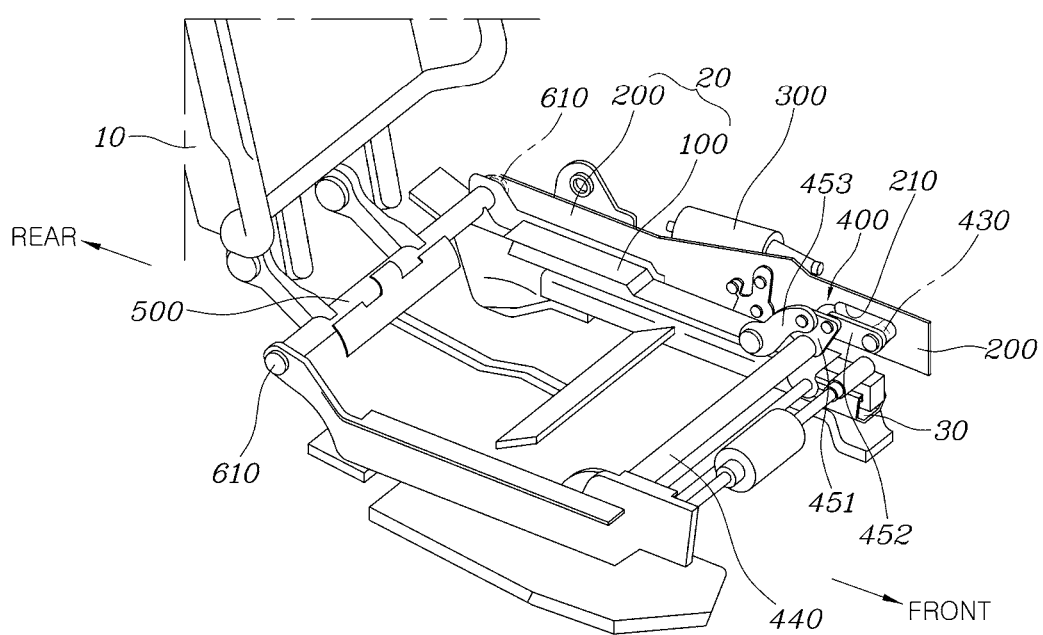
Figure 3:
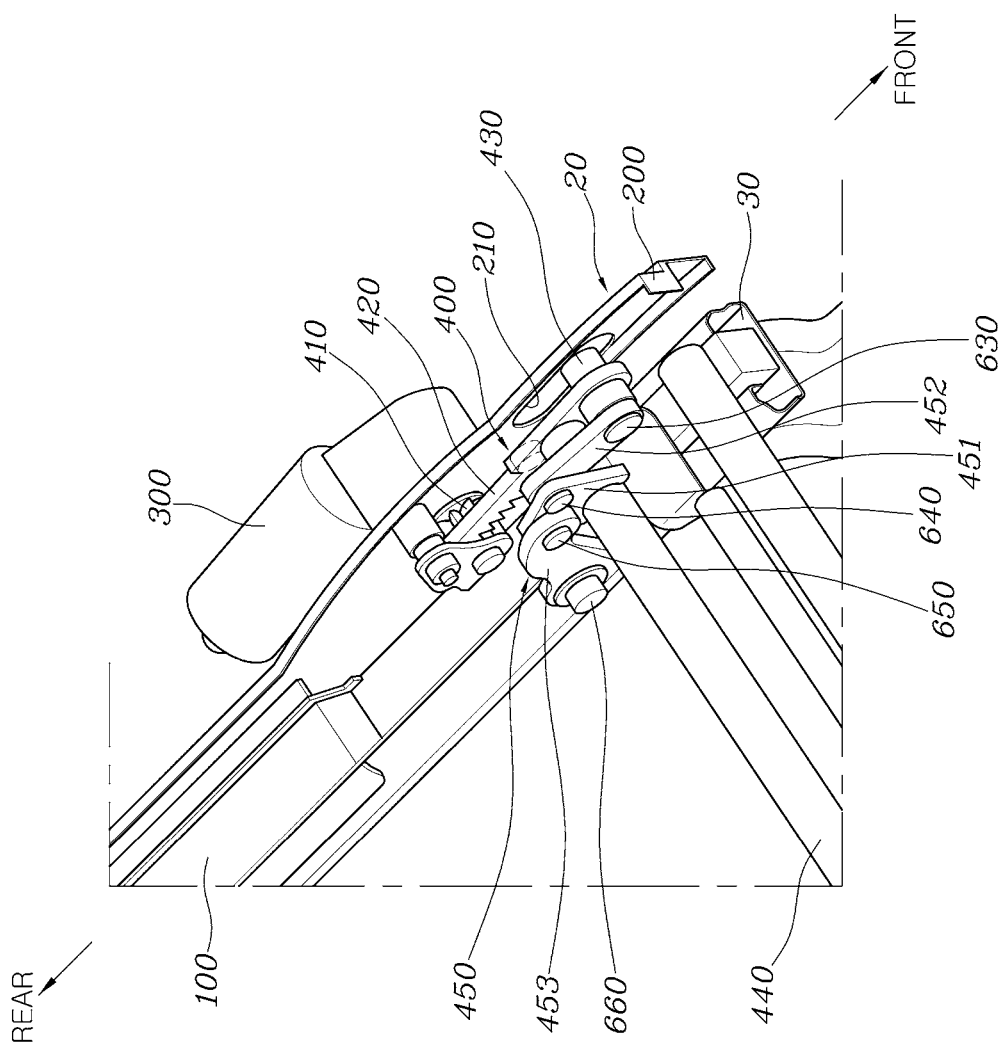
FIG. 3 is an enlarged view of the portion where a tilting motor is mounted in FIG. 2.
Figure 4:
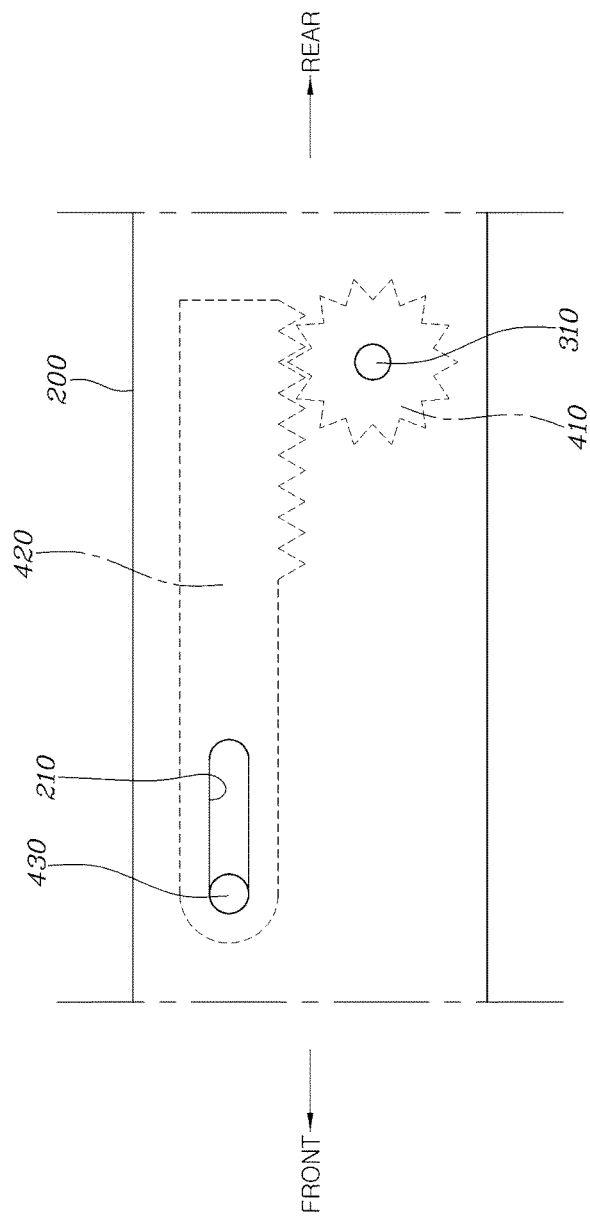
FIG. 4 is a view showing the portion, where a pinion gear and a rack gear are combined, from a side of a cushion tilting frame.
Figure 5:
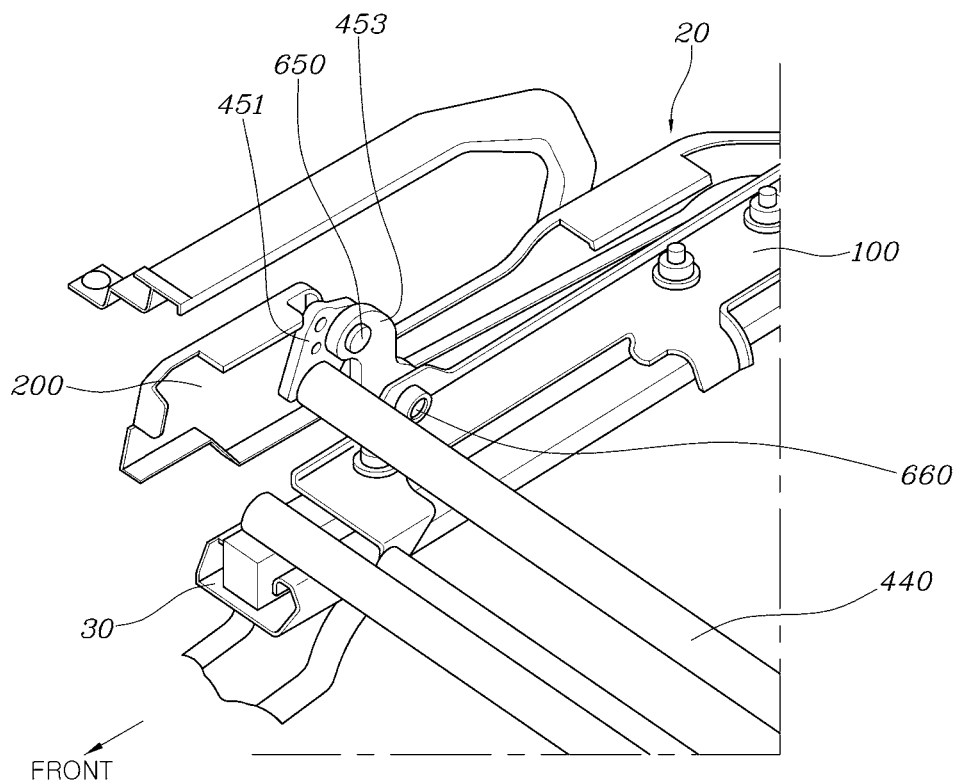
FIG. 5 is an enlarged view showing the opposite side where the tilting motor is not disposed in FIG. 2.
Figure 6:
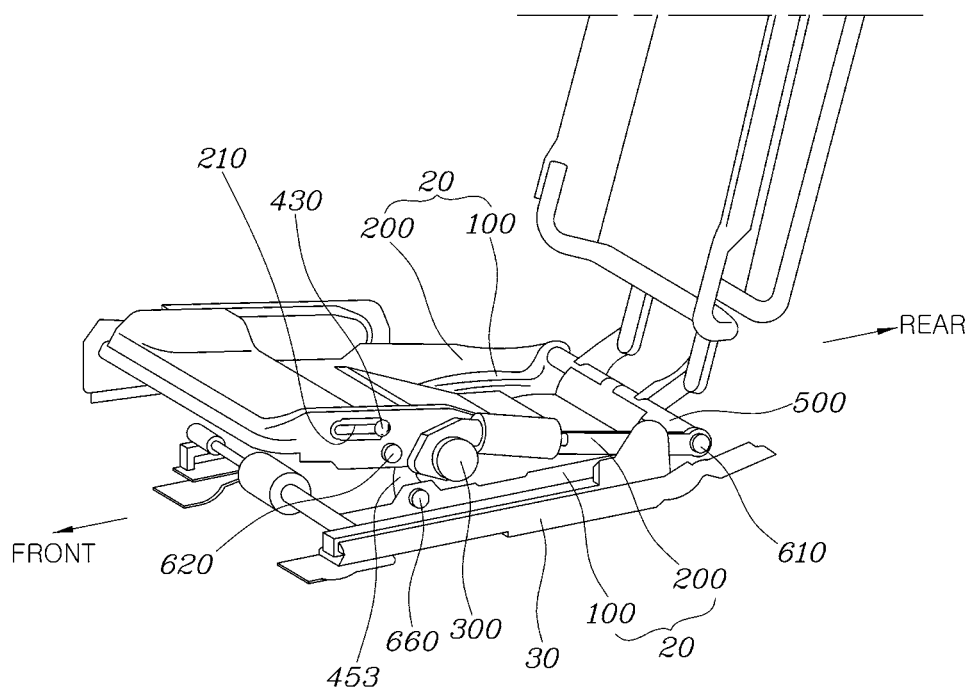
FIG. 6 and FIG. 7 are views showing a tilting completion state.
Figure 7:
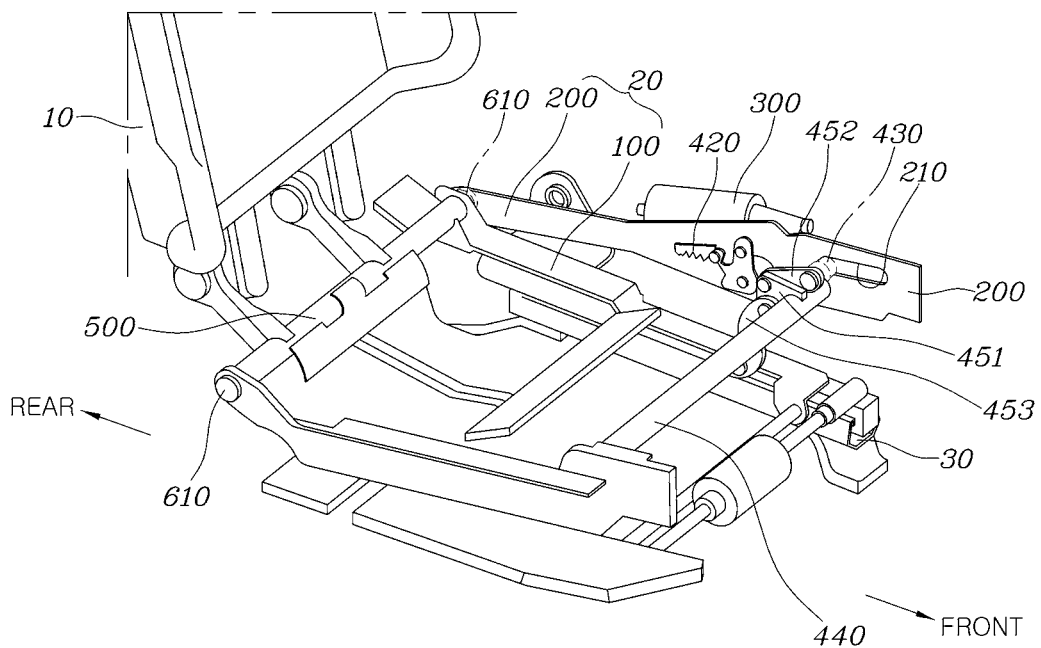

FIG. 1 and FIG. 2 shows the state before tilting and FIG. 6 and FIG. 7 show the state after tilting is finished.

When the tilting motor 300 is operated and the pinion gear 410 is rotated in the state before tilting, the rack gear 420 moves straight rearward thereof. As the rack gear 420 moves straight rearward thereof, the connection shaft 430 also moves straight rearward along the guide slot 210 formed at the cushion tilting frame 200.

When the connection shaft 430 moves rearward thereof, the first link 452 and fixed brackets 451, and the front cross pipe 440 and second links 453 rotate, in which the second link 453 rotates to be vertically erect. As the second links 453 rotates, the front cross pipe 440 moves up and the cushion tilting frame 200 coupled to the front cross pipe 440 is lifted up, whereby tilting is finished.

Returning to the initial position before tilting is performed in the reverse order described above by backward rotation of the tilting motor 300.

The state of the seatback 1 and the seat cushion 2 indicated by a dotted line in FIG. 8 is the initial state before the seatback 1 reclines and the seat cushion 2 tilts. Furthermore, the solid line indicates the state in which the seatback 1 finishes reclining and the seat cushion 2 finishes tilting.

In the initial state (indicated by the dotted line) of the seatback 1 and the seat cushion 2, when the seatback 1 reclines rearward in accordance with various aspects of the present invention, the seat cushion 2 correspondingly slides forward thereof. In the present process, tilting that lifts up the front end portion of the cushion tilting frame 200 is finished by the operation of the tilting motor 300.

As described above, when tilting that lifts up the front end portion of the cushion tilting frame 200 is performed with reclining of the seatback 1, the thighs 3a of the passenger 3 sitting on the seat are sufficiently supported by the lifted seat cushion 2 (the state indicated by the solid line). Accordingly, there is an advantage that it is possible to further improve convenience and riding comfort of the passenger in the rear seat.

As described above, according to various exemplary embodiments of the present invention, a tilting function is additionally provided to the seat cushion 2 of a rear seat, so it is possible to sufficiently support the thighs 3a of the passenger 3 sitting in the rear seat by tilting up the front end portion of the seat cushion 2 when the seatback 1 reclines. Accordingly, there is an advantage that it is possible to further improve convenience and riding comfort of the passenger in the rear seat.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of tilting a seat cushion of a vehicle rear seat, the apparatus comprising:
   a cushion tilting frame coupled to a cushion base frame and configured to tilt by moving upwards and downwards with respect to the cushion base frame coupled to seat rails;

a tilting motor mounted to the cushion tilting frame; and
a power transmission mechanism connecting the tilting motor, the cushion base frame, and the cushion tilting frame to tilt the cushion tilting frame when the tilting motor is operated,
wherein the tilting motor and the power transmission mechanism are disposed in parallel with each other along a front and rear straight line to reduce a package of a driving mechanism.

2. The apparatus of claim 1, further including:
a rear cross pipe disposed in a predetermined direction through a rear end portion of the cushion base frame and coupled to a rear end portion of the cushion tilting frame,
wherein when power from the tilting motor is transmitted to the cushion tilting frame through the power transmission mechanism, the cushion tilting frame tilts by rotating up and down around the rear cross pipe, which is configured as a hinge point, with respect to the cushion base frame.

3. The apparatus of claim 1, wherein the tilting motor is coupled to be positioned outside a side of the cushion tilting frame.

4. The apparatus of claim 1, wherein the power transmission mechanism includes:
a pinion gear connected to the tilting motor and rotatably coupled to the cushion tilting frame, wherein the pinion gear is configured to rotate with respect to the cushion tilting frame when the tilting motor is operated;
a rack gear engaged with the pinion gear and configured to move straight when the pinion gear is rotated;
a connection shaft coupled to an end of the rack gear, disposed through a guide slot formed at the cushion tilting frame, and movable along the guide slot when the rack gear is moved;
a front cross pipe disposed in a predetermined direction through a front end portion of the cushion tilting frame to be rotatable with respect to the cushion tilting frame; and
a link assembly coupled to connect the connection shaft, the front cross pipe, and the cushion base frame.

5. The apparatus of claim 4, wherein the guide slot is formed to be elongated in the cushion tilting frame in a longitudinal direction of the cushion tilting frame ahead of the pinion gear so that the connection shaft moves in the longitudinal direction along the guide slot.

6. The apparatus of claim 4, wherein the link assembly includes:
a fixed bracket integrally fixed to the front cross pipe;
a first link pivotally coupled to the connection shaft and the fixed bracket so that first and second end portions of the first link is configured to rotate; and
a second link pivotally coupled to the fixed bracket and the cushion base frame so that first and second end portions of the second link is configured to rotate.

7. The apparatus of claim 6,
wherein the tilting motor, the pinion gear, the rack gear, the connection shaft, and the first link are each one piece and positioned on only one side of a seat cushion frame; and
wherein the fixed bracket and the second link are each two pieces and positioned on left and right sides of the seat cushion frame.

8. The apparatus of claim 4, wherein the pinion gear is positioned inside a side of the cushion tilting frame to be rotatable with respect to the cushion tilting frame by power received from the tilting motor.

9. The apparatus of claim 4, wherein the rack gear is mounted in a longitudinal direction of the cushion tilting frame with a rear end portion of the rack gear engaged with the pinion gear.

10. The apparatus of claim 4,
wherein the connection shaft is disposed in the predetermined direction through a front end portion of the rack gear; and
wherein an external portion of the connection shaft passes through the guide slot and an internal portion thereof is coupled to the link assembly.

11. The apparatus of claim 4, wherein rotational motion of the tilting motor changes into straight motion through the pinion gear, the rack gear, and the connection shaft, the straight motion changes back into rotational motion through the link assembly and is then transmitted to the cushion tilting frame, and a sitting surface of the cushion tilting frame is tilted up and down by the transmitted rotational motion.

* * * * *